July 15, 1958  J. H. SIMMONS  2,843,369
IMPACT MEANS FOR BREAKING UP FROZEN GROUND
Filed Nov. 21, 1956
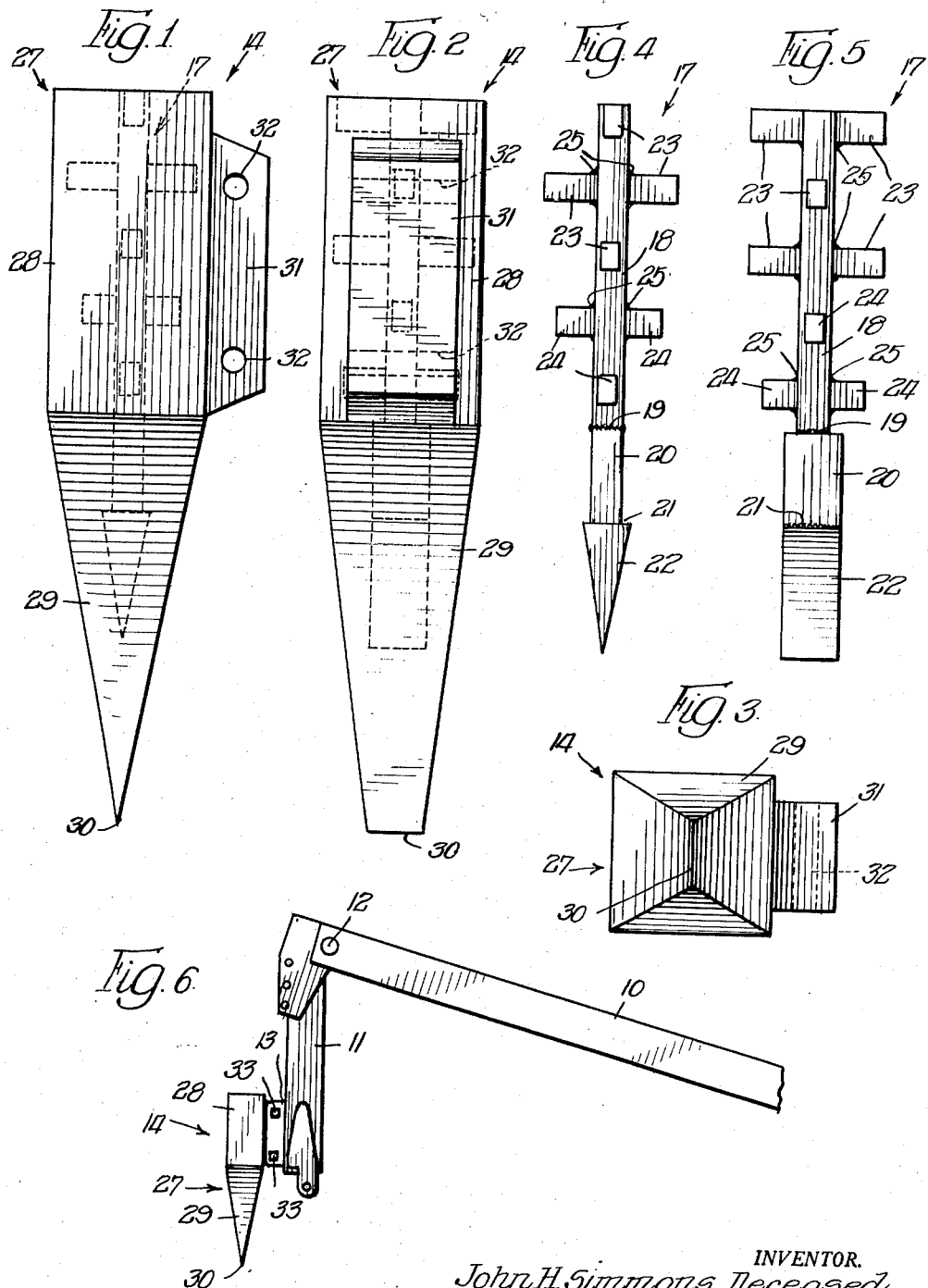
INVENTOR.
John H. Simmons, Deceased
by Jeanette Simmons, Administratrix
By Robert R. Lockwood
atty

United States Patent Office 2,843,369
Patented July 15, 1958

2,843,369

IMPACT MEANS FOR BREAKING UP FROZEN GROUND

John H. Simmons, deceased, late of Hazel Green, Wis., by Jeanette Simmons, administratrix, Hazel Green, Wis.

Application November 21, 1956, Serial No. 623,739

1 Claim. (Cl. 262—33)

This invention relates, generally, to earth moving means and it has particular relation to means for breaking up frozen ground.

While excavation of ground ordinarily frozen during the winter months is more readily accomplished during the spring, summer and fall months, it is often necessary to dig when the ground is frozen. Conventional shovels, buckets, and the like operated by earth moving equipment, such as a power shovel or a drag shovel, are relatively inefficient, by themselves, for this purpose. Accordingly, among the objects of this invention are: To provide simple and efficient means for breaking up frozen ground; to provide a device for this purpose that can be attached as a unit to a power shovel or drag shovel in place of the shovel, clam bucket or dragline ordinarily used; and to construct the device so that it will resist the shock incident to its operation and be of such shape and have sufficient mass to penetrate and break up the ground when it is dropped vertically.

Other objects of this invention will, in part, appear hereinafter.

This invention is disclosed in the embodiment thereof shown in the accompanying drawing and it comprises the features of construction, combination of elements and arrangement of parts that will be exemplified in the construction hereinafter set forth and the scope of the application of which will be indicated in the appended claim.

For a more complete understanding of the nature and scope of this invention reference can be had to the following detailed description, taken together with the accompanying drawing, in which:

Figure 1 is a view, in side elevation, of a frostbreaker constructed in accordance with this invention;

Figure 2 is a view of the frostbreaker shown in Figure 1, the view being taken looking from right to left;

Figure 3 is a bottom plan view of the frostbreaker shown in Figure 1;

Figure 4 is a view, in side elevation, of the core that is embedded in the casing of the frostbreaker shown in the preceding figures;

Figure 5 is a view of the core shown in Figure 4, the view being taken looking from right to left; and Figure 6 is a view, at a reduced scale, of the frostbreaker and showing how it can be applied to the depending vertical arm at the outer end of a boom of a conventional earth moving machine, such as a power shovel.

Referring now particularly to Figure 6 of the drawing, it will be observed that the reference character 10 designates a boom of an earth moving machine such as a power shovel. It will be understood that provision is made for swinging the boom 10 about vertical and horizontal axes and for dropping it rapidly, all in accordance with conventional practice. At the outer end of the boom 10 there is a depending vertical arm 11 which is secured at 12 to the boom 10 and near its lower end on its forward side is provided with ears 13 for receiving therebetween a frostbreaker, shown generally at 14, which is constructed in accordance with this invention.

The frostbreaker 14 includes a central core that is indicated, generally, at 17 in Figures 4 and 5 of the drawing. It is formed preferably of sections of cold rolled steel in order to provide the requisite strength and resiliency for resisting the shocks incident to the dropping of the frostbreaker 14. The core 17 includes a central member 18 which may have a square cross section and welded at 19 to its lower end is a shank 20 which, in turn, is welded at 21 to the upper end of a chisel shaped tip 22. The central member 18 of the core 17 is provided with laterally extending arms 23 and 24 which are welded thereto as indicated at 25. It will be observed that the upper eight arms 23 are slightly longer than the lower four arms 24.

The core 17, constructed as described of relatively high strength steel, is placed in a mold and a casing, shown generally at 27 in Figures 1, 2 and 3, of cast iron is poured around it. In this manner the core 17 is embedded in the cast iron casing 27 and serves to reinforce it and makes it capable of withstanding readily the mechanical shocks to which the frostbreaker 14 may be subjected in operation.

It will be observed that the upper section 28 of the casing 27 is a rectangular parallelepiped while the lower section 29 is prismoidal and has a lower chisel edge 30 to facilitate entry into the ground.

Any suitable means can be provided for mounting the frostbreaker 14 on the depending vertical arm 11. For example, mounting means 31 in the form of an integral lateral extension can be provided of such shape and size as to interfit between the ears 13 at the lower end of the vertical arm 11. Suitable holes 32 are provided in the mounting means 31 for receiving pins or bolts 33 as shown in Figure 6. The mounting means 31 can be cast integrally with the upper section 28 of the casing 27 or it can be welded thereto.

In operation the frostbreaker 14 is mounted on the depending vertical arm 11 of the boom 10, for example. Thereafter the boom 10 is repeatedly raised and dropped quickly so as to fall under the influence of gravity. Preferably the weight of the frostbreaker 14 is of the order of 1500 pounds so that its mass, together with the mass of the depending vertical arm 11 and boom 10, is available for forcing the lower chisel edge 30 into the ground, particularly frozen ground. Experience indicates that this arrangement is highly effective in breaking up frozen ground sufficiently to permit its removal by conventional power shovel or dragline equipment.

When the lower chisel edge 30 becomes blunted and worn, it can be built up by weld metal and ground down to provide the desired chisel edge.

Since certain further changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

What is claimed as new is:

A frostbreaker for breaking up frozen ground and adapted to be lifted and dropped by suitable operating means comprising, in combination, an elongated core of cold rolled steel having laterally extending arms and the lower end chisel shaped, an elongated casing of cast iron embedding said core, the upper section of said core and casing being a rectangular parallelepiped and the lower section being prismoidal to facilitate entry into the ground, and mounting means extending from said upper section for fastening to the operating means (References on following page)

References Cited in the file of this patent

UNITED STATES PATENTS

| | | |
|---|---|---|
| 36,302 | Murray | Aug. 26, 1862 |
| 52,641 | Gates | Feb. 13, 1866 |
| 1,447,341 | Davidson | Mar. 6, 1923 |
| 1,804,360 | Magee | May 5, 1931 |
| 1,841,268 | McKinlay | Jan. 12, 1932 |
| 2,747,851 | Marsh | May 29, 1956 |

OTHER REFERENCES

"Steel and Its Heat Treatment," vol. I, by D. K. Bullens, 1938, John Wiley and Sons, Inc., page 251.